United States Patent [19]

Prewo et al.

[11] Patent Number: 4,857,093
[45] Date of Patent: Aug. 15, 1989

[54] METHOD FOR PRODUCING INTEGRAL CHOPPED FIBER REINFORCED GLASS OR GLASS-CERAMIC STRUCTURES

[75] Inventors: Karl M. Prewo, Vernon; Eric Minford, South Windsor, both of Conn.

[73] Assignee: United Technologies Corporation, Hartford, Conn.

[21] Appl. No.: 124,324

[22] Filed: Nov. 23, 1987

[51] Int. Cl.$^4$ .............................................. C03B 29/02
[52] U.S. Cl. ......................................... 65/36; 65/42; 156/631; 156/657
[58] Field of Search ............... 65/3.2, 23, 18.1, 36, 65/42, 31; 156/630, 631, 634, 656, 657

[56] References Cited

U.S. PATENT DOCUMENTS

| | | | |
|---|---|---|---|
| 4,331,383 | 5/1982 | Christiansen | 65/36 X |
| 4,357,286 | 11/1982 | Stalcup et al. | 65/18.1 X |
| 4,410,394 | 10/1983 | Stalcup et al. | 156/630 |
| 4,464,192 | 8/1984 | Layden et al. | 65/18.1 |

FOREIGN PATENT DOCUMENTS 2172593 9/1986 United Kingdom .................... 65/36

*Primary Examiner*—Robert L. Lindsay

[57] ABSTRACT

A chopped fiber reinforced glass or glass-ceramic matrix integral structure having no bond lines. The structure comprises a face plate, a back plate, and a grid array of chamber walls. The face plate connects to the back plate through the chamber walls forming a grid array of chambers. The back plate has an array of apertures that lead to the chambers. The structure is fabricated by disposing at least two mold inserts in a mold housing having a bottom and sides. The mold inserts are in contact and in an array that follows the surface contours of the mold. The mold inserts and mold insert array is not capable of lateral movement. Heated chopped glass or glass ceramic impregnated fibers are displaced into the mold under pressure to form a composite. The composite is cooled and the mold inserts are removed by chemical dissolution.

2 Claims, 2 Drawing Sheets

METHOD FOR PRODUCING INTEGRAL CHOPPED FIBER REINFORCED GLASS OR GLASS-CERAMIC STRUCTURES

DESCRIPTION

1. Technical Field

The field of art to which this invention pertains is lightweight composite structural elements, particularly optical elements of the reflecting type and methods of making same.

2. Background Art

Because of the many physical property requirements of mirrors for high technology applications (e.g. lasers), both a variety of materials and designs have been employed in attempts to optimize the particular properties necessary for a composite used for these applications. For example, while a laser mirror must have the requisite reflective properties, cost and availability of materials as well as ease of fabrication are also important factors. Such mirrors should also desirably have low density for ease of use in the types of apparatus where they will be used, but without porosity. Furthermore, such mirrors ideally should have high elastic stiffness and high strength along with high fracture toughness. And stability is of the utmost importance both from the point of view of the fine resolution-type work environment the mirrors will be used in, and the inaccessibility of the apparatus which these mirrors would be used in, for example, outer space applications. These stability properties includes low thermal expansion, high thermal conductivity, and environmental stability. Environmental stability includes such things as dimensional stability and mirror integrity regardless of moisture conditions, vacuum conditions, or ultraviolet light exposure, and mirror integrity and dimensional stability at both high and low temperatures. Because high technology mirrors are used for space applications weight is also an important factor.

Carbon fiber reinforced glass and glass ceramic composites are excellent materials for these applications in that they possess exceptional dimensional stability and high structural toughness. See commonly assigned U.S. Pat. Nos. 4,410,394 entitled "Methods of Making Cooled Thermally Stable Composite Mirrors" and 4,464,192 entitled "Molding Process for Fiber Reinforced Glass Matrix Composite Articles". In addition, these composites can be fabricated more rapidly than the traditional monolithic glasses and glass-ceramics used for large mirror applications because of their ability to be rapidly heated and cooled without cracking and their superior ability to be machined. The fabrication of large light weight mirrors is, however, also a structural problem in that sufficient structural rigidity must be achieved at a minimum weight. It has been typical in the past to fabricate such articles by the bonding of top and bottom composite places to an inner core. This process, however, results in distinct bond lines, between surfaces and core, which can act as regions for delamination.

Thus there has been a constant search in the art for fiber reinforced structures and methods for making the same, particularly composite mirror configurations.

DISCLOSURE OF INVENTION

This invention is directed to a chopped fiber reinforced glass or glass-ceramic matrix integral structure having no bond lines. The structure comprises a face plate, a back plate, and a grid array of chamber walls. The face plate connects to the back plate through the chamber walls forming a grid array of chambers. The back plate has an array of apertures that lead to the chambers.

Another aspect of this invention is directed to a method of fabricating an integral chopped fiber reinforced glass or glass-ceramic matrix structure having no bond lines. The method comprises disposing at least two mold inserts in a mold housing having a bottom and sides. The mold inserts are in contact and in an array that follows the surface contours of the mold. The mold inserts and mold insert array is not capable of lateral movement. Heated chopped glass or glass ceramic impregnated fibers are displaced into the mold under pressure to form a composite. The composite is cooled and the mold inserts are removed by chemical dissolution.

The foregoing, and other features and advantages of the present invention will become more apparent from the following description and accompanying drawings.

BEST MODE FOR CARRYING OUT THE INVENTION

Figure 1:
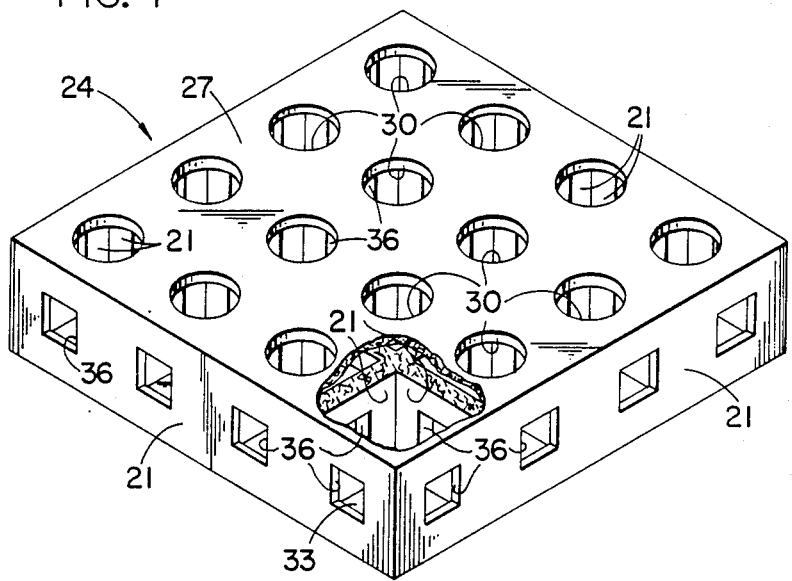
FIG. 1 is a perspective view partly broken away of the backplate of a lightweight composite structure of this invention.
Figure 2:
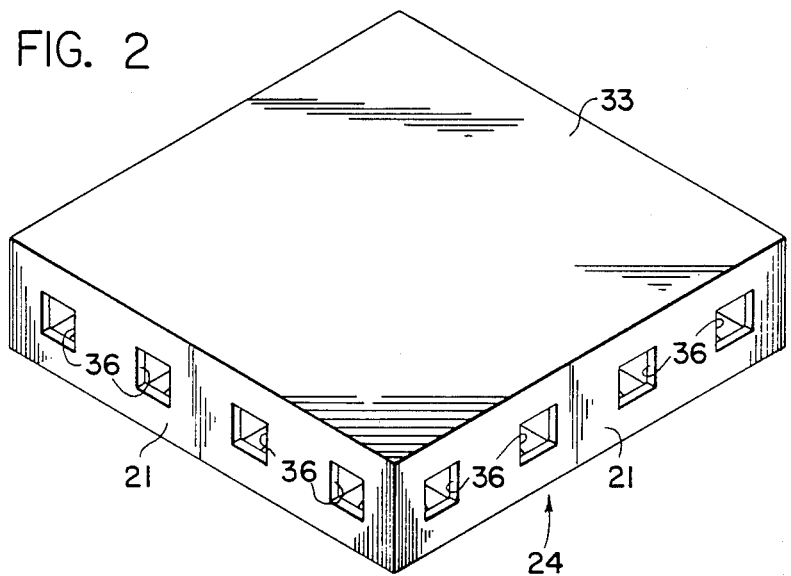
FIG. 2 is a perspective view of the front plate of the composite lightweight structure of this invention.

FIGS. 1 and 2 illustrate perspective views of the molded composite part 24 of this invention. Face plate 33 can be a flat plate, a curved surface plate, or other such configurations depending on the particular application. Similarly, back plate 27 can be a flat plate, a curved plate or other such shaped surfaces. Back plate 27 is connected to face plate 33 by chamber walls 21. Chamber walls 21 form a grid array (e.g., matrix) of chambers 39 that are disposed in between back plate 27 and face plate 33 and follow the contours of their surfaces. Back plate 27 has an array of apertures 30 that provide openings for chambers 39 facilitating the removal of mold inserts that are more fully described below. This shape forms a strong, lightweight, integral structure that, for example, provides a surface for high technology mirrors integral with a framework that can be connected to the desired substructure.

Preferably chamber walls 21 have apertures 36 therein since this facilitates a lightweight structure without unduly sacrificing strength. It is especially preferred that each chamber wall 21 has an aperture 36 since they facilitate the integral molding of this structure since the mold inserts are in contact through the apertures 36. By having the mold inserts in contact with each other, they are prevented from lateral movement as more fully described below.

The mold used to make the above lightweight integral glass-ceramic structures are critical as they contribute to the attainment of structures that are complex yet integral. According to FIG. 3 which illustrates a perspective view partly broken away of a preferred tool (mold) 3 including a plurality of chamber-forming inserts 6 (their composition described below) having protrusions 12 that are disposed in a plane. The protrusions 12 are in contact with a mold plate 9. The protrusions form an array of mold insert 6 material in the back plate 27 of the finished composite 24. Since the mold insert 6 material is accessible, it may be removed by a variety of methods more fully described below. The inserts 6 are aligned so that there are channels 13 between consecutive inserts 6 and channels 14 between inserts 6 and mold walls 15. These channels 13, 14 extend substantially normal to the back plate 9 beyond the insert 6. Preferably inserts 6 have spacers 18 extending therefrom substantially coplanar with a planar array of inserts 6. In other applications, the inserts 6 may follow the contours of the face and back plates. The spacers 18 extend a length so that all the inserts 6 are in contact with contiguous inserts and the inserts 6 that are disposed around the periphery of the array are in contact with mold wall 15. This may be accomplished in a variety of fashions, for example, each insert 6 may have spacers 18 on each side or every other insert 6 may have spacers 18. The spacers 18 act to lock the array of inserts 6 into position (e.g. prevent lateral movement) so that during molding they do not shift their position resulting in a misshaped part. The spacers 18 should not totally block channels 13, 14. The thickness of the spacers 18 define the thickness of the channels 13, 14 while the area of the spacers 18 defines the size and shape of holes which are included in the resulting chamber walls 21 in composite part 24 according to FIG. 1 described earlier. The spacer 18 size may be adjusted depending on weight and strength considerations.

Figure 3:
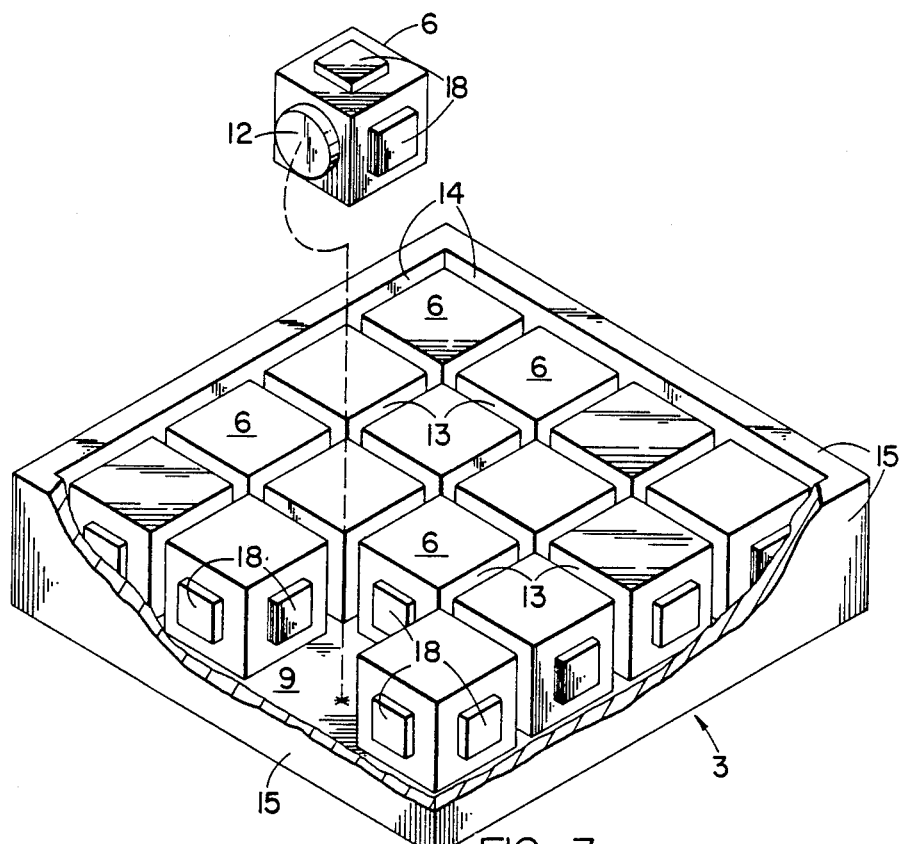
FIG. 3 is a perspective view partly broken away of the mold and inserts of this invention.
Figure 4:
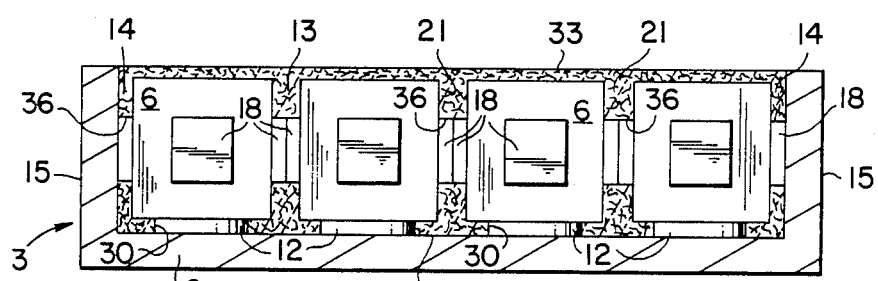
FIG. 4 is a side view of the mold and inserts of this invention.

FIG. 4 which is a side view of FIG. 3 illustrates the planar array of inserts 6 in mold 3 where the spacers 18 prevent the inserts 6 from lateral movement. Clearly alternative configurations for an array of inserts are possible, for example, any space filling polygon (e.g. 3,4,6 sided) may be used. It is preferred that the inserts are as large as possible (since this will make the resulting composite core structure less dense and thus lighter) while retaining sufficient strength. In another configuration every insert need not have spacers 18 thereon. For example an array of cylinders would not require spacers 18 but would still provide the protection from lateral movement during molding since an array of cylinder shaped inserts would contact each other and still provide the channels that result in chamber walls 21 in the resultant composite part 24.

The glass and glass-ceramic structures of this invention may be made with the following compositions and methods.

While a variety of ceramic and carbon fibers can be used in the lightweight structures of this invention, such as Nicalon TM Silicon Carbine fibers (Nippon Carbon, Japan) Hercules HMS graphite fiber, BASF GY-70 (formerly DG102). The latter consists of 384 fibers/tow and has an oxidized finish. It is 8 microns in diameter, has a modulus of elasticity of 531 GPa ($77 \times 10^6$ psi). It has a tensile strength of 1724 MPa (250 ksi) and a density of 1.96 gm/cm$^3$. The fiber is typically used at about 15% to 50% by volume based on the graphite-glass composite and preferably at about 30% by volume.

The glass used preferably has a very low coefficient of thermal expansion matched close, but not equal to that of the graphite fibers used. This is because graphite has a highly negative axial coefficient of thermal expansion and the glass has a positive but small coefficient of thermal expansion. Particularly suitable for the purpose of this ivention is CGW 7740 borosilicate glass (Corning Glass Works) with an anneal point of 500° C., a softening point of 821° C., a liquidus temperature of 1017° C., a density of 2.23 grams per cubic centimeter, an index of refraction of 1.474, a dielectric constant of 4.6, a coefficient of linear expansion of 32.5 cm/cm° C. $\times 10^{-7}$ and a modulus of elasticity of $9.1 \times 10^6$ psi. Preferably, the particle size of the glass is such that at least 90% passes through a 36.0 mesh screen. Another well suited glass of similar properties is CGW 7070 borosilicate glass (Corning Glass Works).

Low coefficient of thermal expansion glass-ceramics (e.g. less than $35 \times 10^{-7}$ cm/cm° C. C.T.E.) are also suitable matrices for the purpose of this invention. Particularly suitable are the lithium aluminosilicate (LAS) glass-ceramics due to their compatibility with carbon fibers and ease of fabrication when in the glassy state.

Any polymeric binder which dissolves or disperses readily in the particular carrier material selected and provides lubricity to facilitate cold pressing can be used with the present invention. Latex acrylic-type polymers and in particular Rhoplex TM latex-acrylic (Rohm & Haas Corporation, Philadelphia, Pa.) have been found to be particularly suitable binder materials for the process of the present invention. Similarly, the Carbowax TM (union Carbide Corporation) series of polymers and in particular, Carbowax 4000 is preferred. Alternatively, any inorganic binder which dissolves or disperses readily in the particular carrier material selected can be used with the present invention. Colloidal silica solutions and in particular, Ludox TM (E. I. DuPont de Nemours, Del.) have been found to be particularly suitable binder materials for the process of the present invention. Accordingly, any carrier material compatible with such binders can also be used, with water being preferred.

While the amounts of materials may vary, the slurry is generally prepared so that the mixture of glass matrix powder, binder, and carrier liquid gives a stiff mixture when added to the fibers. Typically, the amount of glass added will be such as to give about 15% to about 50% by volume concentration of fibers when the carrier liquid and binder have been removed. Typically, for each gram of $-325$ mesh glass powder in the slurry, there will be about 1.80 milliliters of carrier liquid (preferably water), and about 0.2 milliliters of organic binder. The final molded article generally contains about 50% to about 85% by volume glass matrix and preferably about 70%.

The fiber tows are then drawn through the glass-binder-water slurry in such a way that the slurry saturates the fiber tow. When the typical proportions given above are employed, it will be found that the fiber tows will be impregnated with an amount of glass sufficient to bring the volume fraction of glass into the 50% to 85% range desired. The impregnated tows are then wound onto a mandrel and dried. The dried tows are then chopped to a length useful with the intended mold. The length selected depends on the smallest size channel thickness (e.g. chamber wall thickness) and material performance required. Preferably, the fibers are short enough to prevent clumping of the particular molding composition when passing through such a channel. It is especially preferred that such fiber tows are about 0.635 centimeter to about 2.54 cm in length. For example, with a channel thickness of about 0.127 cm fiber tows less than 0.635 cm in length were used.

The molding composition is then heat treated to drive off the remaining water and binder and then loaded into the reservoir chamber of a suitable molding apparatus. Generally, the glass mix is placed in the tool reservoir, the tool (described below) is heated to the temperatures described below, pressure is applied via a plunger forcing the heated mix into the cavity (mold shape) below.

Alternatively, the molding composition may be hot pressed to form suitable billets for injection molding subsequent to burning off the carrier liquid and binder in a suitable atmosphere. And in some instances, depending upon the size and shape of the part to be made, a simple mechanical mixture of chopped fibers and glassy powder such as achievable in a suitable blender may constitute a suitable molding compound which can be injection molded without further predensification. However, the very low density of such mixtures (typically about 10% of the density of the molded object) would require a very large molding apparatus with substantial debulking capability.

The molding composition, either in loose or preconsolidated form, is now ready for injection molding. The molding apparatus (including mold) is heated to a temperature sufficient so that the glass matrix softens preferably having a viscosity of about $10^3$ to about $10^5$ poise, where poise is the cgs unit of absolute viscosity and is equal to 0.1 Pascal second. Above about $10^5$ poise, the glass matrix can be too viscous and incomplete filling of the mold may occur. Below about $10^3$ poise, the glass matrix can be too fluid and separation of the fibers and matrix may occur. For the conventional glasses and glass-ceramics described above, this requires temperatures typically about 900 degrees centigrade (° C.) to about 1500° C. However, for the preferred carbon fiber-borosilicate glass mixture, the temperature is about 1000° C. to about 1250° C.

The heated glass matrix/fiber mixture is then displaced (i.e. transferred) into the mold having the desired composition, the mold is typically maintained at about 1100° C. to about 1250° C. until the mold is filled. For the compositions described above, this is typically about 0.25 hour to about 1.0 hour. Once filled, it is allowed to cool typically at a rate of about 15° C./minute to about 30° C./minute because a significantly higher rate of cooling may result in excessive cracking of the glass matrix. Generally, pressure on the glass matrix/fiber composition is maintained sufficient to prevent relaxation of the composite until the strain point of the glass is reached. The strain point is defined in ASTM C336 and C598. Also, the strain temperature is the lower end of the annealing range and is determined to be at a glass viscosity of approximately $10^{14.5}$ poise. Preferably, pressures of about 7 MPa to about 17 MPa are maintained for typically about 2 hours. This will depend on the specific glass composition and molding temperature used, to prevent relaxation of the composite structure which could result in porosity formation.

Subsequent to cool-down the inserts 6 are removed. Inserts 6 may be made of any material that can withstand the molding operating environment. In addition if the insert 6 is to be removed by chemical dissolution (described below) it must have a composition that is capable of dissolution without harming the composite structure. Many metallic alloy materials are suitable. Exemplary materials are stainless steel, nickel, and nichrome. Several ceramic materials may also be chosen. Aluminum oxide, zirconia and carbon are examples. The inserts may be removed by a variety of methods depending on their shape, composition, coefficient of thermal expansion, etc. Depending on the respective coefficients of thermal expansion of the inserts 6 and ceramic, it may be possible to remove the tool as the tool will shrink away from the composite during cool-down from the hot pressing temperature. A metal tool can also be removed easily from the composite by acid dissolution. See commonly assigned U.S. Pat. No. 4,410,394. Thus the metal inserts 6 in FIGS. 1 and 2 can be removed by treatment with a warm 50% aqueous solution of nitric acid followed by rinsing with water.

The above process results in a lightweight, integral composite structure which has many uses. For example, the structure surface can be used as a reflecting mirror. Typically, the composite surface is coated with conventional laser radiation reflecting layers such as chromium-gold alloys by conventional methods such as vapor deposition and cathode sputtering.

EXAMPLE 1

A length of 525 meters of GY—70 TM graphite fibers (BASF, Charlotte, N.C.) (384 filaments per tow) with a weight of 22.0 grams was impregnated with a glass-water-binder slurry by unrolling the fiber from the feed spool, immersing the yarn in an agitated slurry, and winding the saturated yarn on a take-up mandrel. The slurry consisted of 350 grams of Corning 7070 borosilicate glass powder (—325 mesh), 45 milliliters of Rhoplex latex-acrylic, and 450 milliliters of distilled water. Sufficient slurry impregnated the length of yarn to add 55.8 grams of glass. The saturated yarn was dried on the take-up mandrel to remove the water.

After drying, the impregnated yarn was removed from the take-up mandrel and cut to an average tow length of 0.635 cm. The chopped molding composition was then heat treated in air for one hour at 450° C. to remove the organic binder. The chopped molding composition was then placed in a tool above the array of molding inserts similar to that shown in FIG. 1, where the mold walls 15 and back plate were graphite and the inserts 6 were stainless steel. The mold assembly was then placed in a vacuum hot press and heated to 1175° C. and a load calculated to apply 6.9 MPa to the plunger was applied and maintained while the furnace temperature was held at 1175° C. for 30 minutes. Furnace power was then shut off and the assembly cooled to 400° C. at which point pressure was removed. The assembly was cooled to room temperature and the molded part, including the inserts, was removed from the mold.

The inserts were removed by acid dissolution by immersing the part in a mixture of 75% nitric acid and 25% hydrochloric acid, followed by rinsing with water.

In all instances described above, composite mirrors with integral structures are produced with not only high thermal stability and dimensional integrity, but mirrors which can be used over a range of operating temperatures.

Although this disclosure has been primarily directed to mirror structures, it should be understood that it can be used for a variety of other structures where lightweight, strong, integral frameworks would be advantageous, examples being structural insulating surfaces and hot aircraft skins.

The increased strength of the composites of the present invention is the result of a lack of bond lines in the structure. These undesirable bond lines are achieved entirely through the use of a bonding medium that is a filler comprising glass, polymer or metal. Each of these materials has a significant disadvantage. A glass bonding medium is brittle and may easily crack under repeated loading. It is also probably of a different composition and thus CTE than the glass used in the composite since its bonding temperature must be less than that of the basic composite to avoid composite relaxation, with resultant porosity formation during bonding. A metal bond will have a higher CTE than the composite and may therefore cause nonuniformities in the composite mirror CTE behavior. A polymer bond like the metal, will have too high a CTE and also may change its properties with time during the life of the structure and also may affect the precision of the mirror.

The process of the present invention is especially well suited to the fabrication of complex shapes. It is particularly suited for those in which reinforcement is needed in more than the two dimensions typically provided in traditionally hot pressed composites.

The process facilitates the production of net shape parts since complex multipart dies with complex geometries can be used in contrast to traditional hot pressing processes. Not only does the present invention provide a method which is readily adaptable to making complex shapes of fiber reinforced glass matrix composites by mass production, but the resulting article has unusual strength in three dimensions by virtue of the flow of the composite molding composition around the molding inserts.

Although this invention has been shown and described with respect to detailed embodiments thereof, it will be understood by those skilled in the art that various changes in form and detail thereof may be made without departing from the spirit and scope of the claimed invention.

We claim:

1. A method of fabricating a lightweight integral chopped fiber reinforced glass or glass-ceramic matrix mirror structure comprising:
   (a) disposing at least two mold inserts in a mold housing having a bottom and sides, said mold inserts disposed in contact to prevent lateral movement and in an array that follows the surface contours of said mold;
   (b) impregnating continuous multifilament carbon fiber yarn with a slurry comprising glass, glass-ceramic powder or a mixture thereof;
   (c) chopping said impregnated multifilament yarn into discontinous lengths;
   (d) exposing said chopped impregnated multifilament yarn to a temperature sufficient so that said matrix softens
   (e) applying a pressure to said heated chopped impregnated multifilament yarn sufficient to displace said heated chopped impregnated multifilament yarn into said mold;
   (f) maintaining a mold pressure sufficient to prevent relaxation of the composite on cooling until the strain point of the glass is reached;
   (g) cooling said composite; and
   (h) removing said mold inserts by chemical dissolution.

2. The method as recited in claim 1 wherein said fibers are carbon.

* * * * *